United States Patent [19]

Kray

[11] 4,298,655

[45] Nov. 3, 1981

[54] AQUEOUS SILICONE RESIN COATING COMPOSITION AND SOLID SUBSTRATE COATED THEREWITH

[75] Inventor: William D. Kray, Burnt Hills, N.Y.

[73] Assignee: General Electric Company, Waterford, N.Y.

[21] Appl. No.: 172,954

[22] Filed: Jul. 28, 1980

[51] Int. Cl.$^3$ .............................................. B32B 27/36
[52] U.S. Cl. .................................... 428/412; 252/407; 260/29.2 M; 428/447
[58] Field of Search .................... 260/45.7 R, 45.95 S, 260/29.2 M, 37 SB, 45.85 R; 252/318, 319, 407; 528/12, 20; 427/387; 428/412, 413, 447; 106/287.12, 287.16, 287.24, 287.34

[56] References Cited

U.S. PATENT DOCUMENTS

| | | | |
|---|---|---|---|
| 3,546,305 | 12/1970 | Archer | 252/407 X |
| 3,708,225 | 2/1973 | Misch et al. | 351/160 |
| 3,887,580 | 6/1975 | Patrikeev et al. | 252/319 |
| 3,976,497 | 8/1976 | Clark | 106/287 |
| 3,986,997 | 10/1976 | Clark | 260/29.2 |
| 4,177,315 | 12/1979 | Ubersax | 428/336 |

Primary Examiner—Ronald H. Smith
Assistant Examiner—Thurman K. Page
Attorney, Agent, or Firm—Morgan, Finnegan, Pine, Foley & Lee

[57] ABSTRACT

An improved silicone resin coating composition is provided, the composition comprising a dispersion of colloidal silica in an aliphatic alcohol-water solution of the partial condensate of a silanol with a small stabilizing amount of a $\beta$-dicarbonyl compound added thereto.

18 Claims, No Drawings

AQUEOUS SILICONE RESIN COATING COMPOSITION AND SOLID SUBSTRATE COATED THEREWITH

BACKGROUND OF THE INVENTION

This invention relates to an improved protective coating composition. More particulary, it relates to a silicone resin coating composition which, when applied to a substrate, forms a protective abrasion-resistant coating thereon.

Recently, the substitution of glass glazing with transparent materials which do not shatter or are more resistant to shattering than glass, has become widespread. For example, transparent glazing made from synthetic organic polymers is now utilized in public transportation vehicles, such as trains, buses, taxis and airplanes. Lenses, such as for eyeglasses and other optical instruments, as well as glazing for large buildings, also employ shatter-resistant transparent plastics. The lighter weight of these plastics in comparison to glass is a further advantage, especially in the transportation industry where the weight of the vehicle is a major factor in its fuel economy.

While transparent plastics provide the major advantage of being more resistant to shattering than glass, a serious drawback lies in the ease with which these plastics mar and scratch, due to everyday contact with abrasives, such as dust, cleaning equipment and oftentimes requires replacement of the glazing or lens or the like.

One of the most promising and widely used transparent plastics for glazing is polycarbonate, such as that known as Lexan ®, sold by General Electric Company. It is a tough material, having high impact strength, high heat deflection temperature, good dimensional stability, as well as being self-extinguishing, and is easily fabricated.

Attempts have been made to improve the abrasion resistance of transparent plastics. For example, scratch resistant coatings formed from mixtures of silica, such as colloidal silica or silica gel, and hydrolyzable silanes in a hydrolysis medium, such as alcohol and water, are known. U.S. Pat. Nos. 3,708,225, 3,986,997, 3,976,497 and 4,177,315, for example, describe such compositions.

Copending U.S. application entitled "Silicone Resin Coating Composition," by Howard A. Vaughn, Ser. No. 964,910, filed Nov. 30, 1978 commonly assigned, discloses another abrasion-resistant coating composition. This coating composition has a pH of about 7–8 and has been found to be highly desirable as a protective finish for plastic, as well as metal or metallized substrates. All of the coating solutions tend to have a shorter shelf lift than would be desirable, especially those having a pH of 7–8. It has now been surprisingly discovered herein that the addition of a small amount of a $\beta$-dicarbonyl compound to the coating compositions expecially those disclosed in the afore-mentioned Vaughn application, extends the useful life substantially, as well as providing other improvements in the hard coating which will be discussed in detail hereinafter. The patent and application are incorporated herein by reference.

SUMMARY OF THE INVENTION

Accordingly, it is one object of the present invention to provide an improved stabilized silicone resin coating composition for solid substrates.

Another object of this invention is to provide a stabilized silicone resin coating composition for solid substrates which, when applied, provides an abrasion resistant surface thereto.

Still another object of this invention is to provide a stabilized silicone resin coating composition which is especially well suited for transparent plastics.

A further object of this invention is to provide a stabilized silicone resin coating composition which, when applied to a transparent plastic, does not impair the optical clarity thereof.

A still further object of this invention is to provide a stabilized silicone resin coating composition which, when applied to a solid substrate, not only provides an abrasion resistant coating thereto but also provides a coating with increased resistance to stress cracking.

These and other objects are accomplished herein by an improved coating composition comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, said composition containing 10 to 50 weight percent solids, said solids consisting essentially of 10 to 70 weight percent colloidal silica and 30 to 90 weight percent of the partial condensate, especially such compositions having a pH of from 7.1 to about 7.8, the improvement comprising the intimate admixture of a small stabilizing amount of a $\beta$-dicarbonyl compound to said composition.

DETAILED DESCRIPTION OF THE INVENTION

The coating compositions of this invention are prepared by hydrolyzing an alkyltrialkoxysilane or aryltrialkoxysilane of the formula $RSi(OR)_3$, wherein R is alkyl of from 1 to 3 carbons or aryl, such as phenyl, in an aqueous dispersion of colloidal silica, and intimately admixing a $\beta$-dicarbonyl compound with the resultant reaction product.

In the practice of the present invention, suitable aqueous colloidal silica dispersions generally have a particle size of from 5 to 150 millimicrons in diameter. These silica dispersions are well known in the art and commercially available ones include, for example, those sold under the trademarks of Ludox (duPont) and Nalcoag (NALCO Chemical Co.). Such Colloidal silicas are available as both acidic and basic hydrosols. For the purpose of this invention, wherein the pH of the coating compositions is on the basic side, basic colloidal silica sols are preferred. However, acidic colloidal silicas, wherein the pH is adjusted to a basic level, are also contemplated. In addition, it has been found that colloidal silicas having a low alkali content (e.g., $Na_2O$) yield a more stable coating composition. Thus, colloidal silica having an alkali content of less than 0.35% (calculated as $Na_2O$) are preferred. Moreover, colloidal silicas having average particle size of from 10 to 30 millicrons are also preferred. A particularly preferred one for the purposes herein is known as Ludox LS, sold by duPont Company.

In accordance with this invention, the aqueous colloidal silica dispersion is added to a solution of a small amount of alkyltriacetoxysilane in alkyltrialkoxysilane or aryltrialkoxysilane. The temperature of the reaction mixture is maintained at about 20° C. to about 40° C. and preferably below 25° C. It has been found that in about six to eight hours sufficient trialkoxysilane has reacted to reduce the initial two-phase liquid mixture to one liquid phase in which the now treated silica (i.e., treated by admixture with the trialkoxysilane) is dispersed. In general, the hydrolysis reaction is allowed to continue for a total of about 24 hours to 48 hours, depending upon the desired viscosity of the final product. The more time the hydrolysis reaction is permitted to continue, the higher will be the viscosity of the product. After hydrolysis has been completed, the solids content is adjusted by the addition of alcohol, preferably isobutanol, to the reaction mixture. Other suitable alcohols for this purpose include lower aliphatic alcohols such as methanol, ethanol, propanol, isopropanol, n-butyl alcohol and t-butyl alcohol. Mixtures of such alcohols can be used, too. The solvent system should contain from about 20 to 75 weight percent alcohol to ensure solubility of the partial condensate (siloxanol). Optionally, additional water-miscible polar solvents, such as acetone, butylcellosolve and the like in minor amounts, like no more than 20 weight percent of the cosolvent system, can also be employed. The solids content of the coating composition of this invention is generally preferred to be in the range of from about 10 to 25%, most preferably about 20%, by weight of the total composition. The pH of the resultant coating composition is in the range of from about 3 to about 8, preferably from 7.1 to about 7.8, and especially preferably higher than 7.2. If necessary, dilute base, such as ammonium hydroxide, or weak acid, such as acetic acid, may be added to the composition to adjust the final pH to this desired range.

It has been found herein that it is advantageous to include a β-dicarbonyl compound in the coating composition. This β-dicarbonyl compound may be added to the composition before, during, or after the hydrolysis reaction. Preferably, however, it is added to the composition after the initial solids content has been diluted with alcohol. The β-dicarbonyl compound acts as a stabilizer, to prevent premature gelling especially during storage. For the purposes of this invention, the β-dicarbonyl compound is employed in an amount of from about 2.5 to about 15% by weight of the total solids of the composition. Most advantageous results are achieved when the compound is utilized at about 4% by weight of the total solids.

More specifically, some of the β-dicarbonyl compounds useful in the practice of the invention herein are those having the formula:

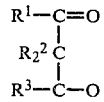

Wherein $R^1$ is a monovalent hydrocarbon radical having from 1 to 18 carbon atoms; $R^2$ is, independently, a monovalent hydrocarbon radical having from 1 to 18 carbon atoms or hydrogen; and $R^3$ is a monovalent radical selected from hydrocarbon or aliphatic hydrocarbonoxy, each having from 1 to 18 carbon atoms.

Among the hydrocarbon radicals in the above formula can be mentioned, for example, alkyl radicals, e.g., methyl, ethyl, propyl, butyl, octyl, etc.; cyloalkyl radicals, e.g., cyclohexyl, cycloheptyl, etc.; aryl radicals, e.g., phenyl, tolyl, naphthyl, xylyl, etc.; aralkyl, e.g., benzyl, phenylethyl, etc., alkenyl and cycloalkenyl, e.g., vinyl, allyl, cyclohexenyl, etc.; and halogenated radicals of the aforementioned type, e.g., chloromethyl, chlorophenyl, dibromophenyl, etc. Hydrocarbonoxy radicals of the corresponding aliphatic series and also illustrated, e.g., by methoxy, ethoxy, propoxy, butoxy, isobutoxy, amyloxy, etc, salts. Partial condensates, ester derivatives and the like of the β-dicarbonyl compounds also function herein. In the above-formula $R^1$ is preferably methyl, $R^3$ is preferably methyl and each of $R^2$ is hydrogen, the compound being also known as 2,4-pentanedione, or acetylacetone, which is commercially available. All of the β-dicarbonyl compounds can be made by those skilled in this art and numerous of them are commercially available, including ethyl acetoacetate, titanium bis-acetylacetonate and the like.

The alkyltriacetoxysilane is used to buffer the basicity of the initial two liquid phase reaction mixture and thereby also temper the hydrolysis rate. While the use of alkyltriacetoxysilane is preferred herein, glacial acetic acid may be used in its place, as well as other acids such as organic acids like propionic, butyric, citric, benzoic, formic, oxalic, and the like. Alkyltriacetoxysilanes wherein the alkyl group contains from 1–6 carbon atoms can be used, alkyl groups having from 1 to 3 carbon atoms being preferred. Methyltriacetoxysilane is most preferred.

The silanetriols, $RSi(OH)_3$, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which upon hydrolysis generate the silanetriols and further liberate the corresponding alcohol. In this way, at least a portion of the alcohol content present in the final coating composition is provided. Upon the generation of the hydroxyl substituents to form

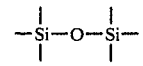

bonding occurs. This condensation takes place over a period of time and is not exhaustive but rather the siloxane retains an appreciable quantity of silicon-bonded hydroxyl groups which render the polymer soluble in the alcohol-water cosolvent. This soluble partial condensate can be characterized as a siloxanol polymer having at least one silicon-bonded hydroxyl group per every three

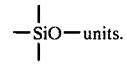

The non-volatile solids portion of the coating composition herein is a mixture of colloidal silica and the partial condensate (or siloxanol) of a silanol. The major portion or all of the partial condensate or siloxanol is obtained from the condensation of $CH_3Si(OH)_3$ and, depending upon the input of ingredients to the hydrolysis reaction, minor portions of partial condensate can be obtained, for example, from the condensation of $CH_3Si(OH)_3$ with $C_2H_5Si(OH)_3$ or $C_3H_7Si(OH)_3$; $CH_3Si(OH)_3$ with $C_6H_5Si(OH)_3$, or even mixtures of the foregoing. For optimum results in the cured coating it is preferred to use all methytrimethoxysilane (thus generating all monomethylsilanetriol) in preparing the coating compositions herein. In the preferred coating compositions herein the partial condensate is the total solids in a cosolvent of alcohol and water, the alcohol comprising from about 50% to 95% by weight of the cosolvent.

The coating compositions of this invention will cure on a substrate at temperatures of, for example, 120° C. without the aid of an added curing catalyst. However, in order to employ more desirable milder curing conditions, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethylammonium acetate, benzyltrimethylammonium acetate, metal carboxylates, like tin octoate and amines such as triethylamine, triethanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base and alkali metal carboxylate catalysts will be generated in situ during the hydrolysis reaction herein.

The amount of curing catalyst can be varied within a wide range, depending upon the desired curing conditions. However, in general, catalyst in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 75°–150° C. to provide a transparent abrasion resistant surface coating.

The coating compositions of the present invention can be applied to a variety of solid substrates by conventional methods, such as flowing or dipping, to form a continuous surface film. Substrates which are especially contemplated herein are transparent and non-transparent plastics and metals. More particularly, these plastics are synthetic organic polymeric substrates such as acrylic polymers, like poly(methymethacrylate), polyesters, such as poly(ethylene terephthalate), poly(butylene terephthalate), etc., polyamides, polyimides, acrylonitrile-styrene copolymers, styreneacrylonitrile-butadiene co-polymers, polyvinyl chloride, butyrates, polyethylene and the like. As noted above, the coating compositions of this invention are especially useful as coatings for polycarbonates, such as those polycarbonates known as Lexan ®, sold by General Electric Company. The metal substrates on which the present protective coatings are utilized include bright and dull metals like aluminum and bright metallized surfaces like sputtered chromium alloy. Other solid substrates contemplated herein include wood, painted surfaces, leather, glass, ceramics and textiles.

By choice of the proper formulation, application conditions and pretreatment, including the use of primers, of the substrate, the coatings can be adhered to substantially all solid substrates. A hard coating having all of the afore-mentioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsesquioxane ($RSiO_{3/2}$). In the finished cured coating the ration of $RSiO_{3/2}$ units to $SiO_2$ will range from about 0.43 to about 9.0, preferably 1 to 3. A cured coating having a ratio of $RSiO_{3/2}$ to $SiO_2$, when R is methyl, of 2 is most preferred. The coating thickness can be varied by means of the particular application technique, but coatings of about 0.5 to 20 microns, preferably 2–10 micron thickness are generally utilized.

In order that those skilled in the art may better understand how to practice the present invention the following example is given by way of illustration and not by way of limitation.

EXAMPLE 22.1 parts by weight of Ludox LS, silica sol (aqueous dispersion of colloidal silica, average particle size is 12 millimicrons, pH of 8.2 sold by duPont) is added to a solution of 0.1 parts by weight of methyltriacetoxysilane in 26.8 parts by weight of methyltrimethoxysilane. The temperature of the reaction mixture is maintained at 20° C. to 30° C., preferably below 25° C. The hydrolysis is allowed to continue for 24 hours. The solids content of the resultant reaction mixture is 40.5% and is diluted to about 20% solids with the addition of isobutanol. 4.1 grams of 2,4-pentanedione is thoroughly mixed with 99 grams of the resultant composition to provide a 4% by weight control of β-dicarbonyl compound. The final composition has a pH of higher than 7.2.

A portion of composition to which no β-dicarbonyl compound has been added is used for control purposes. After 5 months of aging, it is found that the composition according to this invention, containing 4% of 2,4-pentanedione has a viscosity of only 11 centistokes, whereas the control has gelled.

The aged, stabilized coating composition is flow-coated onto a 6″ by 8″ transparent Lexan ® (poly(bisphenol-A carbonate)) panel primed with a thermosetting acrylic emulsion. After air drying for 30 minutes the panel is cured for 1 hour at 120° C. The resultant hard coating is smooth and clear. After 500 Taber Abraser cycles (500 g load, CS-10F wheels) (ANSI-Z26.1-1977 section 5.17) the change in percent haze (Δ%H) is 2.15. It is free of initial cracks. The increase in useful shelf-life is clearly evident.

Obviously, other modifications and variations of the present invention are possible in the light of the above teachings. For example, instead of 2,4-pentanedione, ethyl acetoacetate can be used. It is therefore to be understood that changes may be made in the particular embodiments described above which are within the full intended scope of the invention as defined the appended claims.

I claim:

1. In an aqueous coating composition comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, said composition containing 10 to 50 weight percent solids, said solids consisting essentially of 10 to 70 weight percent colloidal silica and 30 to 90 weight percent of the partial condensate, the improvement comprising the intimate admixture of a small stabilizing of a β-dicarbonyl compound with said composition.

2. An aqueous coating as defined in claim 1 wherein said composition has a pH of from 7.1 to about 7.8 and said β-dicarbonyl compound has the structural formula:

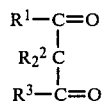

wherein $R^1$ is a monovalent hydrocarbon radical having from 1 to 18 carbon atoms; $R^2$ is, independently, a monovalent hydrocarbon radical having from 1 to 18 carbon atoms or hydrogen; and $R^3$ is a monovalent radical selected from hydrocarbon or aliplhatic hydrocarbonoxy each having from 1 to 18 carbon atoms.

3. An aqueous coating composition as defined in claim 2 wherein $R^1$ is methyl, $R^3$ is methyl, and $R^2$ are each hydrogen.

4. An aqueous coating composition as defined in claim 2 wherein the aliphatic alcohol is a mixture of methanol and isobutanol.

5. An aqueous coating composition as defined in claim 2 wherein said partial condensate is of $CH_3Si(OH)_3$.

6. An aqueous coating composition as defined in claim 2 wherein the pH is from about 7.2 to about 7.8.

7. An aqueous coating composition as defined in claim 2 wherein the composition contains from about 18 to about 25 weight percent solids consisting essentially of 25-45 weight percent colloidal silica and 55-75 weight percent of the partial condensate.

8. An aqueous coating composition as defined in claim 1 wherein said β-dicarbonyl compound is present in an amount of from about 2.5 to about 15% by weight of the total solids of the composition.

9. An aqueous coating composition as defined in claim 3 wherein the composition contains about 20% solids, the partial condensate is of $CH_3Si(OH)_3$, the aliphatic alcohol is a mixture of methanol and isobutanol and said β-dicarbonyl compound is present in an amount of about 4% by weight of the solids content.

10. A solid substrate having at least one surface coated with the aqueous coating composition of claim 1.

11. A solid substrate having at least one surface coated with the aqueous coating composition of claim 2.

12. An article as defined in claim 11 wherein the solid substrate is comprised of a synthetic organic polymer.

13. An article as defined in claim 12 wherein the polymeric substrate is transparent.

14. An article as defined in claim 12 wherein said polymer is a polycarbonate.

15. An article as defined in claim 14 wherein said polycarbonate is transparent.

16. An article as defined in claim 14 wherein said polycarbonate is a transparent poly(bisphenol-A carbonate).

17. An article as defined in claim 10 wherein the aqueous coating composition has been cured on said surface of said solid substrate.

18. An article as defined in claim 11 wherein the aqueous coating composition has been cured on said surface of said solid substrate.

* * * * *

UNITED STATES PATENT AND TRADEMARK OFFICE
CERTIFICATE OF CORRECTION

PATENT NO. : 4,298,655

DATED : November 3, 1981

INVENTOR(S) : Kray

It is certified that error appears in the above—identified patent and that said Letters Patent is hereby corrected as shown below:

Col. 7, line 5, after the word "stabilizing" insert the word -- amount --.

Col. 7, line 7, after the word "coating" insert the word -- composition --.

Signed and Sealed this

Seventeenth Day of August 1982

[SEAL]

Attest:

Attesting Officer

GERALD J. MOSSINGHOFF

Commissioner of Patents and Trademarks